(12) United States Patent
Barreto da Fontura et al.

(10) Patent No.: US 8,965,739 B2
(45) Date of Patent: Feb. 24, 2015

(54) LOOSE COUPLING METHOD BETWEEN A STESS ANALYSIS SYSTEM AND A CONVENTIONAL RESERVOIR SIMULATOR

(75) Inventors: Sergio Augusto Barreto da Fontura, Rio de Janeiro (BR); Nelson Inoue, Rio de Janeiro (BR)

(73) Assignee: Facultades Catolicas, Sociedade Civili Maintenedor da Puc Rio, Rio de Janeiro (BR)

( * ) Notice: Subject to any disclaimer, the term of this patent is extended or adjusted under 35 U.S.C. 154(b) by 299 days.

(21) Appl. No.: 13/262,278

(22) PCT Filed: Mar. 31, 2010

(86) PCT No.: PCT/BR2010/000096
§ 371 (c)(1),
(2), (4) Date: Oct. 27, 2011

(87) PCT Pub. No.: WO2010/111758
PCT Pub. Date: Oct. 7, 2010

(65) Prior Publication Data
US 2012/0041729 A1    Feb. 16, 2012

(30) Foreign Application Priority Data
Mar. 31, 2009   (BR) ...................... 0900908

(51) Int. Cl.
G06F 7/60 (2006.01)
G01V 11/00 (2006.01)
(52) U.S. Cl.
CPC .................... *G01V 11/00* (2013.01)
USPC ........................................................ 703/2

(58) Field of Classification Search
None
See application file for complete search history.

(56) References Cited

U.S. PATENT DOCUMENTS

| 7,177,764 | B2 | 2/2007 | Stone |
| 7,386,431 | B2 | 6/2008 | Siebrits |
| 2002/0032494 | A1* | 3/2002 | Kennon et al. .................. 700/98 |
| 2010/0088076 | A1* | 4/2010 | Koutsabeloulis et al. ........ 703/2 |

FOREIGN PATENT DOCUMENTS

WO    2008070526 A2    6/2008

OTHER PUBLICATIONS

Settari et al. ("Advances in Coupled Geomechanical and Reservoir Modeling With Applications to Reservoir Compaction", Society of Petroleum Engineers, 2001,pp. 334-342).*
Skomedal et al. ("Effect of Pore Pressure and Stress Path on Rock Mechanical Properties for HPHT Application", Society of Petroleum Engineers, 2002,pp. 1-10).*
Samier et al. ("A Practical Iterative Scheme for Coupling Geomechanics With Reservoir Simulation", , Society of Petroleum Engineers, 2007,pp. 1-10) ).*

(Continued)

*Primary Examiner* — Omar Fernandez Rivas
*Assistant Examiner* — Iftekhar Khan
(74) *Attorney, Agent, or Firm* — Laurence P. Colton; Smith Risley Tempel Santos LLC

(57) ABSTRACT

Methods for loosely coupling a stress analysis system to a conventional reservoir simulator by adjusting the flow equation of the conventional reservoir simulator. The solution is obtained by using the methods in a loose, iterative coupling system such than when convergence is reached, the results obtained are close to those of the full coupling system. A system for implementing the methods on a digitally readable medium.

6 Claims, 5 Drawing Sheets

(56) References Cited

OTHER PUBLICATIONS

Long Nghlem ("An Integral Approach for Discretizing the Reservoir Flow Equations", SPE Reservoir Engineering, May 1988,pp. 685-690).*

Tran et al. ("New Iterative Coupling Between a Reservoir Simulator and a Geomechanics Module", Society of Petroleum Engineers, 2004, pp. 362-369).*

Longuemare, P., et al., Geomechanics in Reservoir Simulation: Overview of Coupling Methods and Field Case Study, Oil & Gas Science & Technology—Rev. IFP, vol. 57 (2002), pp. 471-483.

Chin, L.Y., et al., Iterative Coupled Analysis of Geomechanics and Fluid Flow for Rock Compaction in Reservoir Simulation, Oil & Gas Science & Technology—Rev. IFP, vol. 57 (2002), pp. 485-487.

Settari, A., et al., Numerical Techniques Used for Predicting Subsidence Due to Gas Extraction in the North Adriatic Sea, Petroleum Science and Technology, vol. 26 (2008), pp. 1205-1223.

* cited by examiner

LOOSE COUPLING METHOD BETWEEN A STESS ANALYSIS SYSTEM AND A CONVENTIONAL RESERVOIR SIMULATOR

STATEMENT OF RELATED APPLICATIONS

This patent application is the US National Stage under 35 USC 371 of Patent Cooperation Treaty (PCT) International Application No. PCT/BR2010/000096 having an International Filing Date of 31 Mar. 2010, which claims priority on Brazilian Patent Application No. PI 0900908-6 having a filing date of 31 Mar. 2009.

BACKGROUND OF THE INVENTION

1. Field of the Invention

The present invention is directed to methods for loosely coupling a stress analysis system (geomechanical simulator) and a conventional reservoir simulator. In particular, the methods of the invention provide the adjusting of the flow equation of the conventional reservoir simulator, considering the variation of the stress state of the rock. Therefore, the solution obtained using the methods according to the invention in a loose, iterative coupling system, when convergence is reached the results obtained by this solution are close to those of the full coupling system. The present invention is also directed to a system for implementing the invention provided on a digitally readable medium.

2. Prior Art

Recently, there has been great the interest in the study of loose coupling between stress analysis systems and conventional reservoir simulators. The problem of flow and stress can be coupled by using different coupling systems, the three main systems are: full coupling, loose iterative coupling and loose explicit coupling.

In full coupling, the set of equations governing the hydro-mechanical problem is solved simultaneously by a single simulator, featuring the more rigorous formulation of coupling.

In the loose iterative coupling (or two-way coupling), the flow and stress equations are solved separately and sequentially for each time interval. FIG. 1(a) illustrates this system, the information are exchanged in the same time interval, between the conventional reservoir simulator and the stress analysis system until it reaches the convergence of an unknown variable, for example, pressure.

In loose explicit coupling (or one-way coupling), only the conventional reservoir simulator sends information (variation of pore pressure) to the stress analysis system. FIG. 1(b) illustrates this system, no information is sent from the stress analysis system to the conventional reservoir simulator, so the flow problem is not affected by changing in stress state in the reservoir and surrounding rocks.

The four main studies published in the literature concerning loose coupling between stress analysis systems and conventional reservoir simulators are briefly described below.

Settari and Mounts[1] presented one of the first studies about loose coupling of a conventional reservoir simulator (DRS-STEAM) and a stress analysis system (FEM3D). The authors presented an algorithm for loose iterative coupling and the porosity, depending on the pore pressure field and the stress state, which was the only coupling parameter used.

Mainguy and Longuemare[4] had presented three equations to correct the equation for porosity frequently used in conventional reservoir simulator to take into account the variation in stress state. Again, the porosity was the only coupling parameter used in the loose coupling.

Dean et al.[3] showed results of three hydro-mechanical coupling system: loose explicit, loose iterative and full. In the coupling system called by the authors as loose explicit, the porosity is evaluated in two ways: 1) considering the variation of the pore pressure field and stress state; 2) considering the variation of pore pressure field and the calculation of a new compressibility, evaluated by the simple loading hypothesis, such as uniaxial deformation. Only the porosity was considered as coupling parameter in both loose coupling systems. The three coupling systems were implemented in the program Acres (ARCOS's Comprehensive Reservoir Simulator).

Samier and Gennaro[2] proposed a new loose iterative coupling system. In this new coupling system, the iterations are not performed in time intervals, they are performed over the complete time of analysis. The effect of stress analysis is introduced in the porosity through a functionality of the conventional reservoir simulator called pore volume multiplier. Again, the porosity was the only coupling parameter considered.

From reading these four studies, it can be concluded that only the porosity is used as coupling parameter between the stress analysis system and the conventional reservoir simulator.

The Governing Equations

In the present invention, the governing equations are formulated using continuum mechanics, which analyzes the mechanical behavior of modeled materials as a continuous (solid, liquid and gases).

The Governing Equations for the Flow Problem

The flow equation is obtained from the mass conservation law. The mass conservation law can be represented mathematically by the equation:

$$-\nabla \cdot (\rho_f v) = \frac{\partial}{\partial t}(\rho_f \phi) \tag{1}$$

wherein v is the velocity vector (L/t), $\rho_f$ is the specific mass of the fluid (m/L$^3$) and $\phi$ is the porosity.

Darcy's law states that the rate of percolation is directly proportional to the pressure gradient:

$$v = -\frac{k}{\mu}\nabla p \tag{2}$$

wherein k is the absolute permeability (L$^2$), $\mu$ is the viscosity (m/Lt) and p the pore pressure (m/Lt$^2$).

In geomechanical terms, the difference in the development of the flow equation used in conventional reservoir simulation and in the full coupling system is in development of the formulation adopted to evaluate the porosity. In conventional reservoir simulation, the variation of porosity can be related to the variation of pore pressure through the compressibility of rock, using a linear relation.

$$\phi = \phi^0[1+c_r(p-p^0)] \tag{3}$$

wherein $\phi^0$ is the inicial porosity, $p^0$ is the initial pore pressure and $c_r$ is the compressibility of the rock that can be calculated as:

$$c_r = \frac{1}{\phi_0}\frac{\partial \phi}{\partial p} = \frac{1}{V_p^0}\frac{\partial V_p}{\partial p} \tag{4}$$

wherein $V_p^0$ is the porous volume in the initial configuration and $V_p$ is the porous volume in the final configuration.

The fluid compressibility is taken into account in conventional reservoir simulation using the equation:

$$\rho_f = \rho_f^0 [1 + c_f(p - p^0)] \quad (5)$$

wherein $\rho_f^0$ is the initial specific mass of the fluid and $c_f$ is the fluid compressibility which relates the variation of specific mass with the variation of pore pressure.

$$c_f = \frac{1}{\rho_f^0} \frac{\partial \rho_f}{\partial p} = \frac{1}{K_f} \quad (6)$$

wherein $K_f$ is the modulus of volumetric deformation of the fluid.

Introducing equation (3) and (5) in equation (1), the variation of porosity and specific mass of the fluid over time (accumulation term) can be considered in the simulation of conventional reservoirs. The final form of the flow equation can be written as:

$$(c_f \phi^0 + c_r \phi^0) \frac{\partial p}{\partial t} - \frac{k}{\mu} \nabla^2 p = 0 \quad (7)$$

To an elastic, linear and isotropic analysis, the expression of the variation of porosity used in the full coupling system of is comprised of four components that contribute to fluid accumulation (Zienkiewicz et al.[5]).

a) The variation of volumetric deformation: $-d\epsilon_v$;
b) The variation due to compression of the solid matrix by pore pressure: $(1-n)\, dp/K_S$;
c) The variation due to compression of the solid matrix by effective stress: $-K_D/K_S\, (d\epsilon_v + dp/Ks)$;
d) The variation due to compression of the fluid by pore pressure: $ndp/K_f$.

The equation of the variation of porosity is obtained from the sum of the above four components:

$$\phi = \phi^0 + \alpha(\varepsilon_v - \varepsilon_v^0) + \frac{1}{Q}(p - p^0) \quad (8)$$

wherein $\epsilon_v^0$ is the initial volumetric deformation (solids+pores) and $\epsilon_v$ is the final volumetric deformation (solids+pores). The parameter Q of Biot[6] is written as:

$$\frac{1}{Q} = \frac{\phi^0}{K_f} + \frac{\alpha - \phi^0}{K_S} = c_f \phi^0 + c_S(\alpha - \phi^0) \quad (9)$$

wherein $c_s$ is the compressibility of solid matrix ($c_s = 1/K_s$) ans $K_s$ is the modulum of volumetric deformation of solid matrix.

The parameter $\alpha$ of Biot[6] is written in terms of the module of volumetric deformation of the rock and the pores $K_D$ and the volumetric deformation modulus of solid matrix $K_S$ (Zienkiewics et al[5]).

$$\alpha = 1 - \frac{K_D}{K_S} \quad (10)$$

wherein $K_D$ is the volumetric deformation modulus associated to the drained constitutive matrix tangent C.

$$K_D = \frac{m^T C m}{9} = \frac{E}{3(1 - 2v)} \quad (11)$$

wherein m is the identity matrix, E is the Young modulus and v is the Poisson's ratio.

Insert equations (5) and (8) in equation (1), the variation of porosity that takes into account the variation of stress state is considered in terms of accumulation, resulting in the flow equation of full coupling system.

$$[c_f \phi^0 + c_S(\alpha - \phi^0)] \frac{\partial p}{\partial t} - \frac{k}{\mu} \nabla^2 p = -\alpha \frac{\partial \varepsilon_v}{\partial t} \quad (12)$$

The Governing Equations for the Problem Geomechanical

The balance equation is written as:

$$\nabla \cdot \sigma + \rho b = 0 \quad (13)$$

wherein $\delta$ is the total stress tensor and $\rho$ is the total density of the composition, that is:

$$\rho = \phi \rho_f + (1-\phi) \rho_S \quad (14)$$

wherein $\rho_s$ is the density of solid matrix.

The tensor of deformations $\epsilon$ can be written in terms of the vector displacement u as:

$$\epsilon = \tfrac{1}{2}[\nabla u + (\nabla u)^T] \quad (15)$$

The principle of Terzaghi effective stress is written as:

$$\sigma' = \sigma - \alpha m p \quad (16)$$

wherein $\delta'$ is the effective stress tensor.

The effective stress tensor is related to the tensor of deformations through the drained constitutive tangent c matrix.

$$\sigma' = C : \epsilon \quad (17)$$

Introducing equations (15), (16) and (17) in equation (13), the balance equation coupled in terms of displacement and pore pressure can be written as:

$$G \nabla^2 u + \frac{G}{1 - 2v} \nabla \nabla \cdot u = \alpha \nabla p \quad (18)$$

wherein G is the shear module.

The Governing Equations for the Partial Coupling Scheme

FIG. 2 shows the assembly of the governing equations of the loose coupling system, the flow equation (7) is obtained from the conventional reservoirs simulation and the mechanical behavior is governed by the balance equation (12) written in terms of displacement and pore pressure, the same used in the full coupling system. The challenge of this coupled problem is to get from flow equation (7) of conventional reservoir simulation the same response of flow equation (12) of the full coupling system. In general, conventional reservoir simulators are closed-source software (proprietary software), hampering the process of loose coupling, so it is necessary to use external artifices to reshape the flow equation (7) conventional reservoir simulator.

Comparing the flow equations (7) and (12) can be observed that the terms $c_f \phi^0 \partial p / \partial t$ and $k/\mu \nabla^2 p$ are common in the equations. The term $c_r\phi^0\partial p/\partial t$ is found only in the equation (7) and the terms $c_s(\alpha-\phi^0)\partial p/\partial t$ and $\alpha\partial\epsilon_v/\partial t$ are found only in equation (12).

The literature references cited above do not anticipate or even suggest the invention scope. They are listed below in more detail for simple verification.

(1) A. Settari and F. M. Mourits, "Coupling of Geomechanics and Reservoir Simulation Models", Computer Methods and Advances in Geomechanics, Siriwardane & Zanan (Eds), Balkema, Rotterdam (1994).
(2) P. Samiei and S. De Gennaro, "Practical Interative Coupling of Geomechanics with Reservoir Simulation", SPE paper 106188 (2007).
(3) R. H. Dean, X. Gai, C. M. Stone, and S. Mikoff, "A Comparison of Techniques for Coupling Porous Flow and Geomechanics", paper SPE 79709 (2006).
(4) M. Mainguy and P. Longuemare, "Coupling Fluid Flow and Rock Mechanics: Formulations of the Partial Coupling Between Geomechanical and Reservoir Simulators", Oil & Gas Science and Technology, Vol 57, No. 4, 355-367 (2002).
(5) O. C. Zienkiewicz, A. H. C. Chan, M. Shepherd, B. A. Schrefler, and T. Shiomi, "Computational Geomechanics with Special Reference to Earthquake Engineering", John Wiley and Sons, (1999).
(6) M. A. Biot, "General Theory of Three-Dimensional Consolidation", J. Appl. Phys., Vol 12, 155-164, (1940).

Prior art patent has documents relating to this topic, in which the most significant are described below.

Document U.S. Pat. No. 7,386,431 describes a system and method for modeling and simulating the event of "fracture" in oil wells, especially the phenomena known as "interfacial slip" or "debonding" between adjacent layers of the Earth formation.

Document U.S. Pat. No. 7,177,764 describes a method to calculate stress around a fault while computing the prediction of the rock stress/fluid flow by means of the conservation of momentum. The method takes into account the presence of a multi-phase flow, where the number of flowing fluid phases is between 1 and 3.

Document WO 2008/070526 describes a method for calculation and simulating fluid flow in a fractured subterranean reservoir from the combination of discrete fracture networks and homogenization of small fractures.

The present invention differs from these documents by providing alternatives that allow approximating the flow equation of the conventional reservoir simulation to the flow equation of the full coupling system, removing the rock compressibility effect ($c_r\phi^0\partial p/\partial t$) and adding the volumetric deformation effect of rock and the pores ($\alpha\partial\epsilon_v/\partial t$).

Therefore, can be observed that none of the mentioned documents disclose or even suggest at the concepts of the present invention, so that it presents the requirements for patentability.

BRIEF SUMMARY OF THE INVENTION

In a first aspect, is one of the objects of the invention to provide solutions to approximate the flow equation of the conventional reservoir simulation to the flow equation of the full coupling system, considering the effect of the variation of stress state in the reservoir simulation. The present invention therefore provides a loose iterative coupling system between a stress analysis system and a conventional reservoir simulator to obtain similar responses from those obtained from simulators that use a full coupling system, achieved the convergence of the iterative system.

It is another aspect, the invention provides the novel feature of removing the rock compressibility effect ($c_r\phi^0\partial p/\partial t$) and adding the volumetric deformation effect of rock and the pores ($\alpha\partial\epsilon_v/\partial t$) in order to approximate the flow equation of the conventional reservoir simulation to the flow equation of the full coupling system.

A further aspect of the present invention provides a system capable of performing the method of the invention, wherein said system is contained in a digitally readable medium.

These and other objects of the present invention will be better understood based on the detailed description below.

DETAILED DESCRIPTION OF PREFERRED EMBODIMENTS

Figure 1:
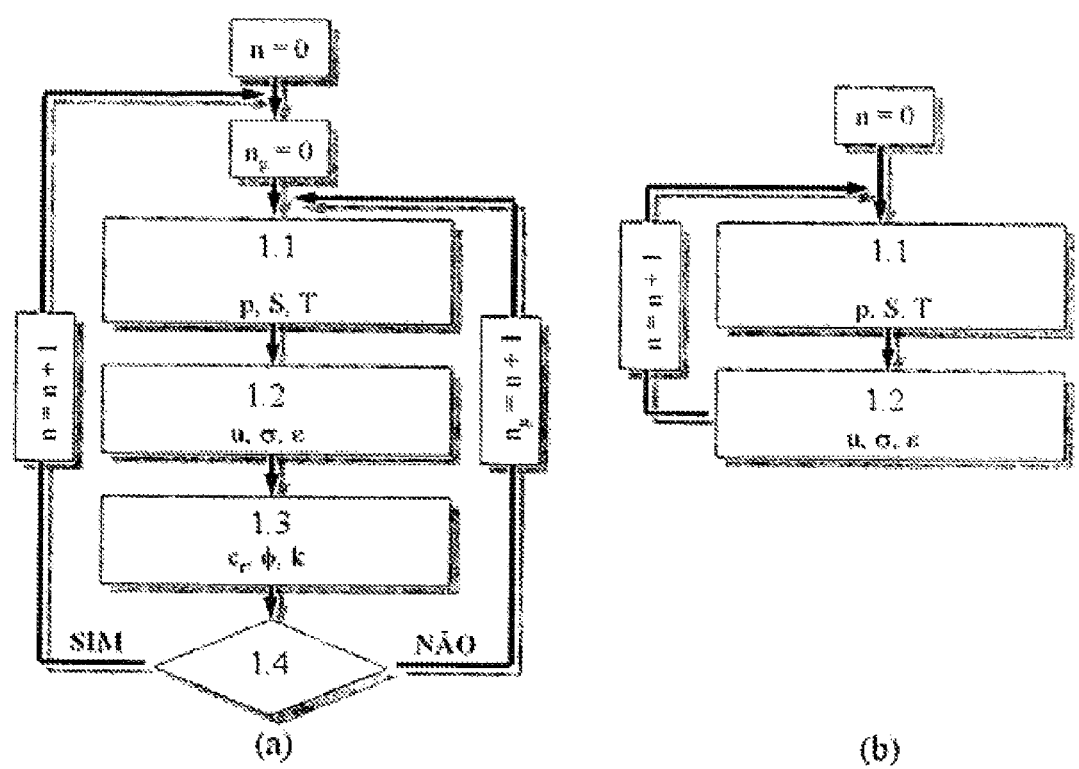
FIG. 1 shows two loose coupling systems: (a) Iterative and (b) Explicit; where n is the number of time intervals; $n_g$ is the number of iterations, 1.1 represents the Conventional Reservoir Simulator; 1.2 the Geomechanical Simulator; 1.3 the Culpling Parameters; and 1.4 the Convergence.
Figure 2:
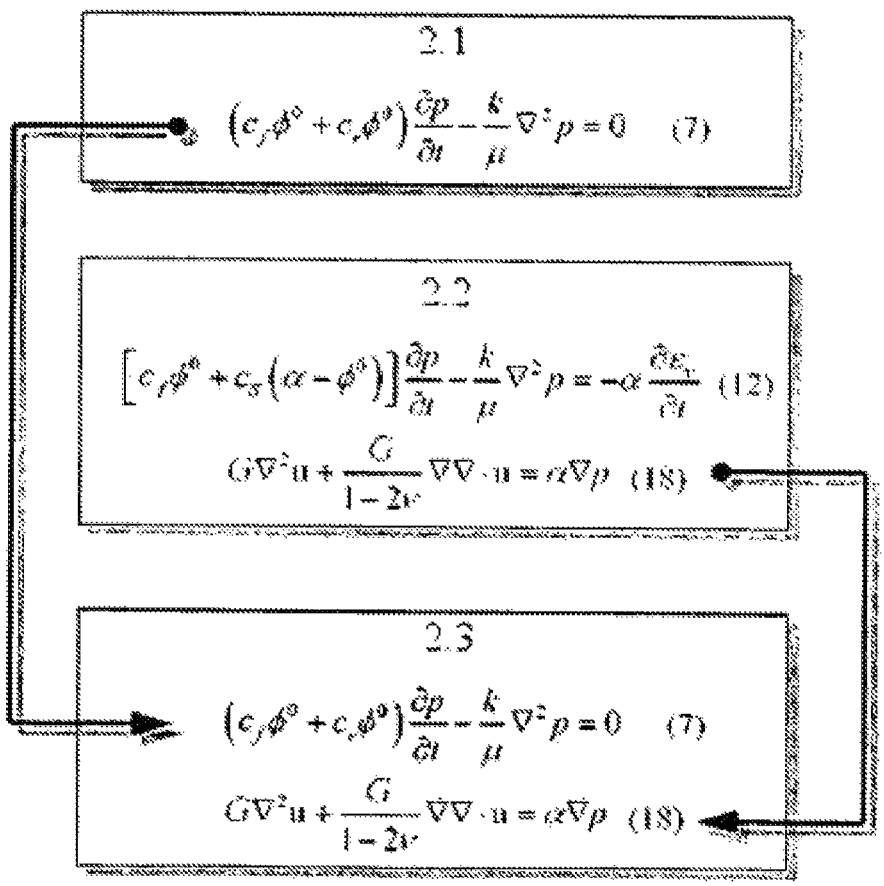
FIG. 2 shows the assembly of the governing equations of the loose coupling system, where 2.1 represents the Conventional Reservoirs Simulation, 2.2 Full Coupling System, and 2.3 the Loose Coupling System.
Figure 3:
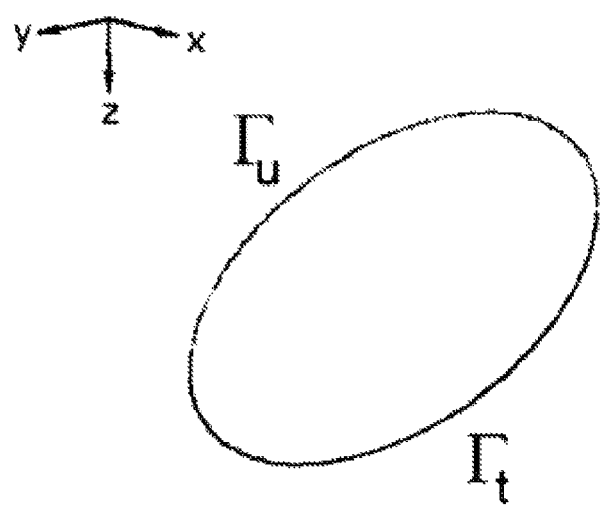
FIG. 3 shows the boundary conditions imposed by natural and essential boundary r.

In this section will presented the steps involved in the method of the invention, which can be embodied through two similar approaches to approximate the flow equation of the conventional reservoirs simulation of the flow equation of the full coupling system.

The method of the invention consists of the loose coupling method between a stress analysis system to a conventional reservoir simulator, by adjusting the flow equation of the conventional reservoir simulator through:

(i) removing the effect of compressibility of rock ($c_r\phi^0\partial p/\partial t$) and
(ii) the addition of the effect of volumetric deformation of the rock and the pores ($\alpha\partial\epsilon_v/\partial t$).

This method provides a solution from a loose iterative coupling system until obtain convergence.

In a preferred embodiment, the method of the invention comprises adjusting the flow equation of the conventional reservoir simulator, so that it is similar to the flow equation of full coupling by the addition or removal of flow rate using wells (known for the purposes of the present invention, as the methodology A).

Methodology A: The first methodology is the use of production wells and injection wells in each cell of the grid of simulation to remove the infinitesimal of flow rate ($c_r\phi^0\partial p/\partial t$)

or add infinitesimal rate of fluid ($\alpha \partial \epsilon_v/\partial t$). The well data are written in the input file of the conventional reservoirs simulator.

To calculate the correct values of the flow rate is necessary to use the approximate solution by finite differences of the partial differential equation of flow. To simplify the development of the formulation, the finite difference approximation will be employed in a single phase and one-dimensional problem, according to equation (19).

$$T^n_{i+\frac{1}{2}} p^{n+1}_{i+1} - \left[\left(\frac{V_b \phi c_f}{a_c B^0 \Delta t}\right)_i + \left(\frac{V_b \phi^0 c_r}{a_c B \Delta t}\right)_i + T^n_{i+\frac{1}{2}} + T^n_{i-\frac{1}{2}}\right] p^{n+1}_i + T^n_{i-\frac{1}{2}} p^{n+1}_{i-1} = \\ -\left[\left(\frac{V_b \phi c_f}{a_c B^0 \Delta t}\right)_i + \left(\frac{V_b \phi^0 c_r}{a_c B \Delta t}\right)_i\right] p^n_i \quad (19)$$

where T is the transmissibility, $V_b$ is the volume of rock (solid+pores) ($L^3$), B is the formation volume factor ($L^3/L^3$), $\Delta_t$ is the time interval (t), n is the time interval previous n+1 is the current time interval and $^0$ is the instant reference.

The first underlined term in equation (20) represents the increment of rate of fluid removed due to the effect of compressibility of the rock and the second underlined term is the increment of rate of fluid added due to the effect of volumetric deformation of the rock (solid+pores). The rock matrix is considered incompressible in the development of this formulation ($c_s$=O).

$$T^n_{i+\frac{1}{2}} p^{n+1}_{i+1} - \left[\left(\frac{V_b \phi c_f}{a_c B^0 \Delta t}\right)_i + \left(\frac{V_b \phi^0 c_r}{a_c B \Delta t}\right)_i + T^n_{i+\frac{1}{2}} + T^n_{i-\frac{1}{2}}\right] p^{n+1}_i + T^n_{i-\frac{1}{2}} p^{n+1}_{i-1} = \\ -\left[\left(\frac{V_b \phi c_f}{\alpha_c B^0 \Delta t}\right) + \left(\frac{V_b \phi^0 c_r}{\alpha_c B^0 \Delta t}\right)\right] p^n_i - \left(\frac{V_b \phi^0 c_r}{\alpha_c B^0 \Delta t}\right)(p^{n-1}_i - p^n_i) + \frac{V_b \Delta \epsilon_V}{\alpha_c B^0 \Delta t} \quad (20)$$

where:

i)

$$\text{if } \left(\frac{V_b \phi^0 c_r}{\alpha_c B^0 \Delta t}\right)(p^{n-1}_i - p^n_i) + \frac{V_b \Delta \epsilon_V}{\alpha_c B^0 \Delta t} > 0 \quad (21)$$

injection wells should be used; and ii)

$$\text{if } \left(\frac{V_b \phi^0 c_r}{\alpha_c B^0 \Delta t}\right)(p^{n-1}_i - p^n_i) + \frac{V_b \Delta \epsilon_V}{\alpha_c B^0 \Delta t} < 0 \quad (22)$$

production wells should be used.

In another preferred embodiment, the method of the invention comprises adjusting the flow equation of the conventional reservoir simulator, so that it is similar to the flow equation of full coupling system, by introducing a pseudo-compressibility (referred to purposes of the present invention, as methodology B).

Methodology B: In the second methodology, the compressibility of the rock ($c_r$) is used as the coupling parameter. The compressibility of the rock calculated should ensure that the response of the flow equation of the conventional reservoir simulation is the same or approximate of the flow equation of full coupling system. This compressibility will be called pseudo-compressibility of the rock and can be evaluated as:

$$c_{r_{pseudo}} = \frac{\varepsilon^{n+1}_{V_i} - \varepsilon^n_{V_i}}{\phi^{n+1}(p^{n-1}_i - p^n_i)} \quad (25)$$

The pseudo-compressibility of the rock, the porosity and pore pressure calculated at the end of the time interval should be rewritten in the input file of the conventional reservoir simulator. The porosity calculated at the end of time interval should be introduced with a porosity of reference ($\phi^0$). If the analysis is performed using the loose iterative coupling system, the pore pressure reference ($p^0$) in equation (3) should be calculated pore pressure at the end of time interval. By the time the analysis converge $p^{n+1}=p''e\phi^{n+1}=\phi''$, is guaranteed a unique and consistent solution with the full coupling system.

The method of the present invention may be embodied in a computer readable medium containing programation code means and means to perform such method.

Below are described two streams of work where the two methodologies of loose coupling between a stress analysis system and a conventional reservoir simulator, are used within a loose iterative coupling system, providing an example of application of the methodologies. The following workflows are intended only to illustrate the various ways of embodiment of the present invention. Should therefore be seen as an illustration, and not restriction, so that achievements here not described, but in the spirit of the invention are protected by this.

EXAMPLE 1

Figure 4:
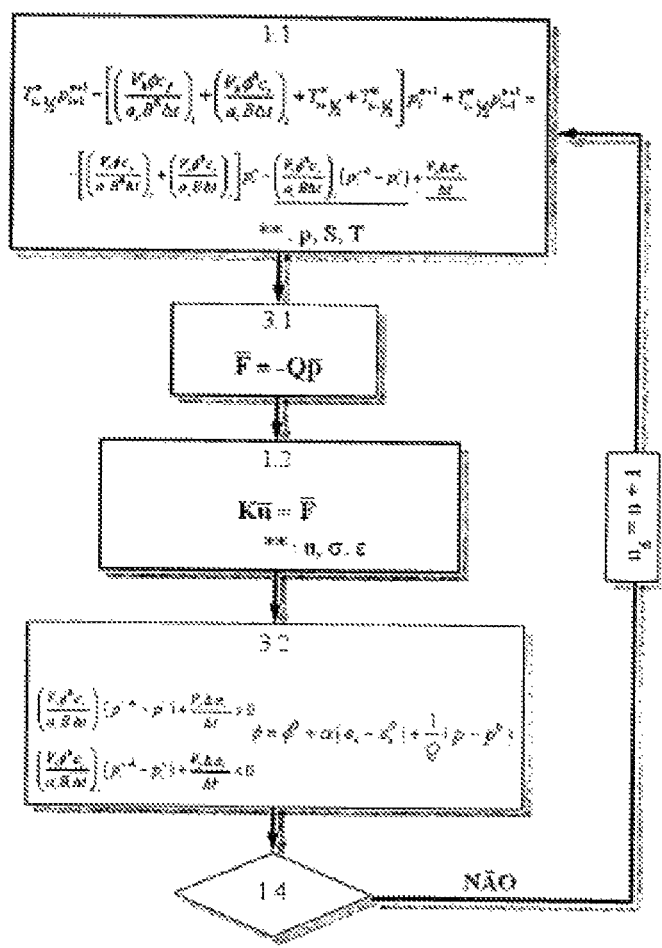
FIG. 4 shows methodology A—Approximation of the flow equation of the conventional reservoir simulator through the addition/removal of rate of fluid and porosity, which 1.1 represents Conventional Reservoir Simulator, 1.2 the Geomechanical Simulator; 1.4 the Convergence, 3.1 the Nodal Forces, 3.2 Fluid Rate Add/Removed and porosity, and ** the Unknowns.

Application of Two Methodologies of Loose Coupling Between a Stress Analysis System and a Conventional Reservoir Simulator within a Time Interval in Loose Iterative Coupling System FIG. 4 illustrates the workflow for using the Methodology A within a loose iterative coupling system, considering a time interval. The partial coupling system was divided into four steps, which are described below. In step 1 the conventional reservoir simulator calculates the primary variables of reservoir simulation during the time interval considered: field of pressure (p), field of saturation (S) and field of temperature (T). In step 2 the variation of the field pore pressure in the time interval is used to calculate the nodal forces to be applied on the nodes of the finite element mesh. In step 3 the stress analysis system calculates the field of displacement (u), the state of deformation ($\epsilon$) and the stress state ($\sigma$) resulting from the application of nodal forces. In step 4 the parameters to approximate the flow equation of the conventional reservoir simulation of flow equation of the full coupling system are calculated using equations (21) and (22). If the convergence of the iterative system is not reached, the addition/removal of flow rate and the new field of porosity are used in a new reservoir simulation at the same time interval.

Figure 5:
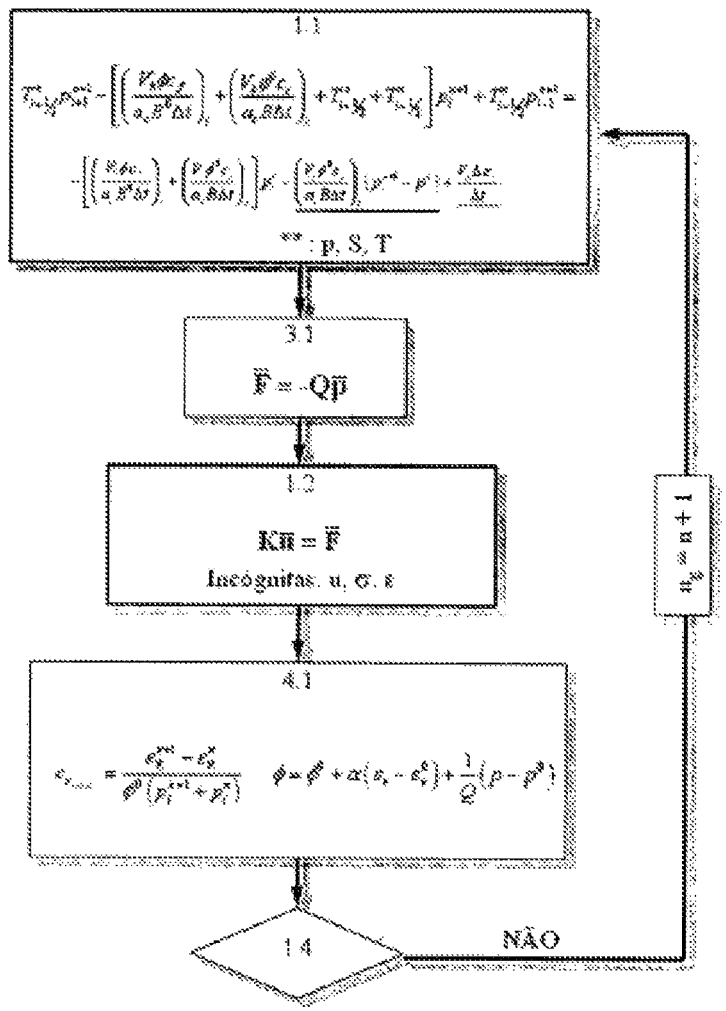
FIG. 5 shows methodology B—Approximation of the flow equation of the conventional reservoir simulator through the pseudo-compressibility of the rock and porosity, where 1.1 represents the Conventional Reservoir Simulator, 1.2 the Geomechanical Simulator; 1.4 the Convergence, 3.1 the Nodal Forces; 4.1 the Pseudo-compressibility of the Rock and porosity, and *** the Unknowns.

FIG. 5 illustrates the workflow for using the methodology B, within a loose iterative coupling system, considering a time interval. The partial coupling scheme was also divided into four stages, but only step 4 is different from the workflow described above. In this methodology is calculated a pseudo-compressibility of the rock through the equation (25), which approximates the flow equation of the conventional reservoir simulation of the flow equation of full coupling system. Again, if convergence is not reached, the pseudo-compressibility of the rock and the new field of porosity are used in a new reservoir simulation at the same time interval.

Those skilled in the art will immediately value the knowledge herein shown, know that small variations in the way of realizing the illustrative examples provided here should be considered within the scope of the invention and the attached claims.

What is claimed is:

1. A system for approximating a flow equation of a conventional reservoir simulator, the system being computer implemented and comprising a non-transitory computer readable medium containing:
a program code means; and
means for performing a method,
wherein the method is a loose coupling method between a stress analysis system and the conventional reservoir simulator, the method being computer implemented and comprising adjusting the flow equation of the conventional reservoir simulator through:
(i) removing a rock compressibility effect ($c^r\phi^0 \partial p/\partial t$); and
(ii) adding a volumetric deformation effect of rock and pores ($\alpha \partial \epsilon_v/\partial t$),
wherein the said adjustment of the flow equation of the conventional reservoir simulator, so that this is similar to a flow equation of a full coupling system, is conducted through the addition or removal of flow rate using wells, according to equations i) or ii):

i)
$$\text{if } \left(\frac{V_b \phi^0 c_r}{\alpha_c B^0 \Delta t}\right)(p_i^{n-1} - p_i^n) + \frac{V_b \Delta \epsilon_V}{\alpha_c B^0 \Delta t} > 0$$

injection wells should be used; and ii)
$$\text{if } \left(\frac{V_b \phi^0 c_r}{\alpha_c B^0 \Delta t}\right)(p_i^{n-1} - p_i^n) + \frac{V_b \Delta \epsilon_V}{\alpha_c B^0 \Delta t} < 0$$

production wells should be used,
wherein:
$c_r$ is the compressibility of the rock,
$\Phi^0$ is the initial porosity,
p is the pore pressure,
t is time,
$\alpha_c = 1-(K_D/K_S)$ where K is the volumetric deformation modulus,
$\epsilon_v$ is the volumetric deformation (solids+pores),
$V_b$ is volume of rock (solid+pores),
$B^0$ is the initial formation volume factor,
T is transmissibility and,
said method providing a solution from a loose iterative coupling system until obtaining a convergence.

2. The system according to claim 1, wherein the compressibility of a solid matrix is null.

3. A loose coupling method between a stress analysis system and a conventional reservoir simulator, the method being computer implemented and comprising adjusting a flow equation of the conventional reservoir simulator through:
(i) removing a rock compressibility effect ($c_r\phi^0 \partial p/\partial t$); and
(ii) adding a volumetric deformation effect of rock and pores ($\alpha \partial \epsilon_v/\partial t$),
said method providing a solution from a loose iterative coupling system until obtaining a convergence,
wherein the said adjustment of the flow equation of the conventional reservoir simulator, so that this is similar to a flow equation of a full coupling system, is conducted through the addition or removal of flow rate using wells, according to equations i) or ii):

$$\text{if } \left(\frac{V_b \phi^0 c_r}{\alpha_c B^0 \Delta t}\right)(p_i^{n-1} - p_i^n) + \frac{V_b \Delta \epsilon_V}{\alpha_c B^0 \Delta t} > 0$$

injection wells should be used; and ii)
$$\text{if } \left(\frac{V_b \phi^0 c_r}{\alpha_c B^0 \Delta t}\right)(p_i^{n-1} - p_i^n) + \frac{V_b \Delta \epsilon_V}{\alpha_c B^0 \Delta t} < 0$$

production wells should be used,
being the solution approximated of a loose flow differential equation by finite differences, the underlined term represents the flow rate added or removed, as represented by the equation:

$$T_{i+\frac{1}{2}}^n p_{i+1}^{n+1} - \left[\left(\frac{V_b \phi c_f}{a_c B^0 \Delta t}\right)_i + \left(\frac{V_b \phi^0 c_r}{a_c B \Delta t}\right)_i + T_{i+\frac{1}{2}}^n + T_{i-\frac{1}{2}}^n\right] p_i^{n+1} + T_{i-\frac{1}{2}}^n p_{i-1}^{n+1} =$$
$$-\left[\left(\frac{V_b \phi c_f}{\alpha_c B^0 \Delta t}\right) + \left(\frac{V_b \phi^0 c_r}{a_c B^0 \Delta t}\right)\right] p_i^n - \left(\frac{V_b \phi^0 c_r}{\alpha_c B^0 \Delta t}\right)(p_i^{n-1} - p_i^n) + \frac{V_b \Delta \epsilon_V}{\alpha_c B^0 \Delta t}.$$

wherein:
$V_b$ is volume of rock (solid+pores),
$\Phi$ is porosity,
$\Phi^0$ is the initial porosity,
$c_r$ is the compressibility of the rock,
$c_f$ is the compressibility of the fluid,
$\alpha_c = 1-(K_D/K_S)$ where K is the volumetric deformation modulus,
B is the formation volume factor,
$B^0$ is the initial formation volume factor,
t is time,
p is pore pressure,
$\epsilon_v$ is the volumetric deformation (solids+pores), and
T is transmissibility.

4. A loose coupling method between a stress analysis system and a conventional reservoir simulator, the method being computer implemented and comprising adjusting a flow equation of the conventional reservoir simulator through:
(i) removing a rock compressibility effect ($c_r\Phi^0 \partial p/\partial t$); and
(ii) adding a volumetric deformation effect of rock and pores ($\alpha \partial \epsilon_v/\partial t$),
said method providing a solution from a loose iterative coupling system until obtaining a convergence,
wherein the adjustment of the flow equation of conventional reservoir simulator, so that this is similar to a flow equation of a full coupling system, is driven by introducing a pseudo-compressibility according to the following equation:

$$c_{r_{pseudo}} = \frac{\epsilon_{V_i}^{n+1} - \epsilon_{V_i}^n}{\phi^{n+1}(p_i^{n-1} - p_i^n)}$$

in the equation approximated by finite differences of a loose differential flow equation, as the following equation:

$$T_{i+\frac{1}{2}}^n p_{i+1}^{n+1} - \left[\left(\frac{V_b \phi c_f}{a_c B^0 \Delta t}\right)_i + \left(\frac{V_b \phi^0 c_r}{a_c B \Delta t}\right)_i + T_{i+\frac{1}{2}}^n + T_{i-\frac{1}{2}}^n\right] p_i^{n+1} + T_{i-\frac{1}{2}}^n p_{i-1}^{n+1} =$$
$$-\left[\left(\frac{V_b \phi c_f}{a_c B^0 \Delta t}\right)_i + \left(\frac{V_b \phi^0 c_r}{a_c B \Delta t}\right)_i\right] p_i^n.$$

wherein:
$V_b$ is volume of rock (solid+pores),
$\Phi$ is porosity,
$\Phi^0$ is the initial porosity,
$c_r$ is the compressibility of the rock,
$c_f$ is the compressibility of the fluid,
$\alpha_c = 1-(K_D/K_S)$ where K is the volumetric deformation modulus,
B is the formation volume factor,
$B^0$ is the initial formation volume factor,
t is time,
p is ore pressure,
$\epsilon_v$ is the volumetric deformation (solids+pores), and
T is transmissibility.

5. The method according to claim 3, wherein the compressibility of a solid matrix is null.

6. The method according to claim 4, wherein the compressibility of a solid matrix is null.

* * * * *